Patented Mar. 16, 1943

2,314,212

UNITED STATES PATENT OFFICE 2,314,212

NITRATION OF CYCLIC ORGANIC COMPOUNDS

George Felix Hennion, South Bend, Ind., assignor to E. I. du Pont de Nemours & Company, Wilmington, Del., a corporation of Delaware No Drawing. Application April 24, 1940, Serial No. 331,419

5 Claims. (Cl. 260—645)

This invention relates to the nitration of organic compounds and especially to improved processes of nitration wherein boron trifluoride is present and acts beneficially in the nitration medium.

It is among the objects of the invention to provide improved processes for the nitration of cyclic organic compounds, such as compounds of the aromatic series and heterocyclic series in which an aromatic nucleus exists. Other objects of the invention will be apparent from the following description. The objects of the invention are attained in general by conducting the nitrations in nitrating media in the presence of boron trifluoride.

The invention will be more fully set forth in the following more detailed description which includes examples that are given as illustrative embodiments of the invention and not as limitations thereof. Parts are expressed in parts by weight unless otherwise noted.

*Example I.—Nitration of nitrobenzene*

To 31 parts of nitrobenzene were added 19 parts of fuming nitric acid (d. 1.5, 92%) and boron trifluoride was passed into the mixture with stirring, until 17 parts had been absorbed. During absorption the temperature was not allowed to exceed 80° C. After absorption of the boron trifluoride the mixture was heated and maintained at 100° C. for thirty minutes. The reaction mixture was poured into 500 parts of hot water and stirred until cool. Dinitrobenzene was precipitated, filtered off and recrystallized from alcohol. The process yielded 36.5 parts of dinitrobenzene having a M. P. of 89.5° to 90° C., or 87% of the theoretical.

*Example II.—Nitration of p-toluene sulfonic acid*

In a similar manner as described in Example I, 8 parts of boron trifluoride were absorbed in a solution of 19 parts of p-toluene sulfonic acid and 9.7 parts of fuming nitric acid, and the mixture was heated. The nitration was completed by maintaining the temperature of the mixture at 100° C. for one hour. The mixture was drowned in 200 parts of water and the acid was neutralized with soda ash. The neutral solution was heated to boiling and 200 parts of cold saturated salt solution were added. The crystalline sodium 2-nitro-4-toluene sulfonate which precipitated on cooling weighed 23.5 g., equal to 92% of the theoretical. The amide made from this product melted at 142.5° C. indicating a pure product.

*Example III.—Successive sulfonation and nitration of toluene*

9.2 parts of toluene were sulfonated with 10.8 parts of 100% sulfuric acid and 7.2 parts of boron trifluoride. The crude product was cooled in a bath of ice and 7 parts of fuming nitric acid were added dropwise. After the addition of nitric acid the mixture was heated to 100° C. and maintained at this temperature for one hour. The nitro sulfonic acid was isolated from the reaction medium as the sodium salt in the manner described in Example II. The yield of sodium 2-nitro-4-toluene sulfonate was 21 parts or 82% of the theoretical. The amide of this product melted at 141.5 to 142° C. indicating a pure product.

*Example IV.—Successive sulfonation and nitration of benzene*

In a similar manner as described in Example III, benzene was successively sulfonated and mono-nitrated in the presence of $BF_3$. The yield of meta-nitro-benzene sulfonic acid sodium salt was 80% of the theoretical.

*Example V.—Nitration of benzoic acid*

In a similar manner as described in Example I, benzoic acid was mono-nitrated in the presence of boron trifluoride. The yield of meta-nitrobenzoic acid was 82% of the theoretical. A practically pure product was indicated by its melting point.

*Example VI.—Nitration of methyl benzoate*

One-tenth mole (1 part) of methyl benzoate was nitrated with .15 part of fuming nitric acid in the presence of 0.12 part of $BF_3$. For this purpose the nitration medium was maintained at 0–10° C. over a period of one hour. The yield of methyl meta-nitrobenzoate as identified by its melting point was 77% of the theoretical.

*Example VII.—Nitration of phthalic anhydride*

One-tenth mole (1 part) of phthalic anhydride was mixed with 0.15 part of fuming nitric acid, 0.48 part of acetic acid and 0.28 part of $BF_3$. The mixture was maintained at 100° C. for 13 hours. The yield of 3-nitrophthalic acid was 81% of the theoretical. The product was practically pure.

*Example VIII.—Successive sulfonation and nitration of toluene followed by recovery of boron trifluoride*

One-half mole (1 part) of toluene was sulfonated with 1 part of 95% sulfuric acid and 1 part boron trifluoride. Nitration was effected with fuming nitric acid without further addition of boron trifluoride. The crude nitro-toluene sulfonic acid was subjected to vacuum distillation and yielded .5 part of material, B. P. 72°–80° at 12 mm. indicating a 50% recovery of boron trifluoride as its dihydrate. A crystalline compound which was a nitro toluene separated from the residue upon cooling and it weighed 2.5 parts.

Example IX.—Nitration of dibenzanthrone

Ten parts of finely divided dibenzanthrone were suspended in 158 parts of carbon tetrachloride and 11.25 parts of 97% nitric acid were added dropwise whilst keeping the temperature of the mixture under 30° C. The suspension was saturated with boron trifluoride and the temperature of the reaction mixture was raised to 65° C. and held at this temperature for one hour. The reaction mixture tended to agglomerate. The mixture was then cooled to 25° C., the product was isolated by filtering, washed successively with dilute soda ash solution and water and then dried. The product contained 5.72% nitrogen as compared to the theoretical content of 5.12% nitrogen in dinitro dibenzanthrone.

Example X.—Nitration of 1,4-5,8-tetraphthalimido anthraquinone

.1 mole (1 part) of 1,4-5,8-tetraphthalimidoanthraquinone (N=6.22%, theory 7.1%) was suspended in 10 parts carbon tetrachloride. 0.6 mole of fuming nitric acid was added and the mixture was saturated with $BF_3$ by bubbling the latter through the agitated mass. After agitating at the refluxing temperature of about 60° C. for 1 to 2 hours the reaction mass was filtered, the free acid was washed out with water and the product was dried. The product contained 6.85% nitrogen which is equivalent to the substitution of approximately one nitro group.

Example XI.—Nitration of 1,4-5,8-tetraphthalimido anthraquinone

.3 mole (1 part) boron trifluoride was dissolved in 19 parts 96% sulfuric acid containing 0.4 mole 95% nitric acid while the mixture was kept at 25°–30° C. The mixture was cooled to 12° to 15° C. and 0.05 mole (1.9 part) 1,4-5,8-tetraphthalimido anthraquinone (N, 6.22%) was slowly added during a period of 1 to 2 hours. This mixture was agitated at 25°–30° C. overnight and thereafter poured into 100 parts of ice water. The resultant precipitate was filtered off, washed free of acid and dried. The yield was 1.14 parts of material containing 9.73% nitrogen and no sulfur, thus corresponding to the substitution of about one nitro group.

In the nitration of cyclic organic compounds in accordance with the invention, it is preferable to use fuming nitric acid, e. g. nitric acid having a strength of about 92% or more, but less concentrated nitric acid can be used but with less favorable results. In general the improved results are attained when about 0.05 mole to about 1 mole of boron trifluoride is present during the nitration per mole of the compound being nitrated but any excess of boron trifluoride above this amount may be present without harmful effect. With fuming nitric acid as the nitrating agent, the improvement effected by having present in the reaction medium more than about 1 mole of boron trifluoride per mole of the cyclic compound being nitrated is dependent on the compound being nitrated. It is sometimes advantageous to permit a greater proportion than the optimum amount of boron trifluoride to be present in the reaction mixture when because of circumstances it is convenient not to avoid the presence of an excess of the catalyst over the optimum. The presence of inert compounds in the reaction mixture is not deleterious. By inert compounds is meant compounds which do not form reaction products with the compounds being nitrated or with boron trifluoride or do not react with nitric acid. It is sometimes advantageous, as in other nitrations, to have present an inert solvent, such as acetic acid, acetic anhydride or sulfuric acid. As in other nitrations, it is preferable to have present in the initial reaction medium as little water as possible but more or less water may be present. As a reactant, fuming nitric acid is preferred.

It has been discovered that in general whenever boron trifluoride is present in a given nitration medium, the nitrations proceed to a given extent at lower temperatures than when the catalyst is not present, and at a given reaction temperature with a given reaction medium the extent of nitration is greater where boron trifluoride is present. For example, di-benzanthrone is nitrated in the presence of boron trifluoride as illustrated in Example 9 to a greater extent than can be done in any process of which I am aware.

It is preferable to use the catalyst in the form of anhydrous boron trifluoride but a hydrate of boron trifluoride may be used. The order in which the compounds of the media are mixed is unimportant, but it is usually convenient to pass the boron trifluoride into the mixture of reactants.

The catalytic effect of boron trifluoride in the nitration of cyclic organic compounds is not confined to any temperature range. It has a beneficial effect at all nitrating temperatures. Although the nitration temperature of most compounds is within a temperature range of about 0° to 100° C., the presence of boron trifluoride is beneficial at higher and lower nitration temperatures.

The presence of boron trifluoride in the nitration medium has the effect of accelerating the nitration and of driving the nitration to completion. Many organic compounds which are slowly and incompletely nitrated in media which do not contain boron trifluoride have been found to nitrate quickly and almost completely even with stoichiometric proportions of nitric acid when boron trifluoride is present in the reaction medium. The readiness with which nitration takes place is also affected by the presence of boron trifluoride and compounds which have hitherto been difficult to nitrate can now be readily nitrated.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises making a nitrating mixture comprising nitric acid, boron trifluoride and an aromatic carbocyclic compound; and maintaining the mixture at a nitrating temperature until an aromatic carbon of the compound is substituted by a nitro group, at least sufficient boron trifluoride being present to assist the nitration.

2. In the process of making a nitrated aromatic carbocyclic compound by the action of nitric acid on said compound, the step which comprises carrying out said nitration in the presence of at least sufficient boron trifluoride to assist the reaction, and treating until an aromatic carbon of said compound is substituted by a nitro group.

3. In the process of making a nitrated aromatic carbocyclic compound by the action of nitric acid on a said compound, the step which comprises carrying out said nitration in the presence of at least sufficient boron trifluoride to assist the nitration, and treating until an aromatic carbon of said compound is substituted by a nitro group.

4. In the process of making a nitrated aromatic carbocyclic compound of the benzene series by the action of nitric acid on a compound of said series, the step which comprises carrying out said nitration in the presence of boron trifluoride until an aromatic carbon of said compound is substituted by a nitro group, at least sufficient of said boron trifluoride being present to assist said nitration.

5. The process which comprises making a nitrating mixture comprising nitric acid, boron trifluoride and a compound having an aromatic carbocyclic grouping; and maintaining the mixture at a nitrating temperature until an aromatic carbon of the compound is substituted by a nitro group, at least sufficient of said boron trifluoride being present to assist the nitration.

GEORGE FELIX HENNION.